(12) United States Patent
Yu et al.

(10) Patent No.: US 11,333,805 B1
(45) Date of Patent: May 17, 2022

(54) LOW GLARE LUMINAIRES

(71) Applicant: VODE LIGHTING, LLC, Sonoma, CA (US)

(72) Inventors: Scott Yu, Sonoma, CA (US); Richard Wong, Sonoma, CA (US)

(73) Assignee: VODE LIGHTING, LLC, Sonoma, CA (US)

( * ) Notice: Subject to any disclaimer, the term of this patent is extended or adjusted under 35 U.S.C. 154(b) by 0 days.

(21) Appl. No.: 17/387,380

(22) Filed: Jul. 28, 2021

Related U.S. Application Data

(63) Continuation-in-part of application No. 17/320,899, filed on May 14, 2021.

(51) Int. Cl.
| | | |
|---|---|---|
| *G02B 5/00* | (2006.01) | |
| *G02B 5/02* | (2006.01) | |
| *F21V 14/04* | (2006.01) | |
| *F21V 7/00* | (2006.01) | |
| *F21V 7/10* | (2006.01) | |
| *F21Y 105/10* | (2016.01) | |
| *F21Y 115/10* | (2016.01) | |

(52) U.S. Cl.
CPC .......... *G02B 5/0284* (2013.01); *F21V 7/0008* (2013.01); *F21V 7/0066* (2013.01); *F21V 7/10* (2013.01); *F21V 14/04* (2013.01); *F21Y 2105/10* (2016.08); *F21Y 2115/10* (2016.08)

(58) Field of Classification Search
CPC ....... G02B 5/0284; F21V 7/10; F21V 7/0066; F21V 7/05; F21V 7/041; F21V 7/048; F21V 7/0008; F21V 14/04
See application file for complete search history.

(56) References Cited

U.S. PATENT DOCUMENTS

| | | | | |
|---|---|---|---|---|
| 7,959,326 | B2* | 6/2011 | Laporte | F21V 14/06 362/249.02 |
| 9,228,715 | B2* | 1/2016 | Wong | F21V 7/0083 |
| 9,625,125 | B1* | 4/2017 | Bryant | F21S 8/033 |
| 2009/0257224 | A1* | 10/2009 | Huang | F21V 7/0083 362/235 |
| 2009/0323330 | A1* | 12/2009 | Gordin | F21V 5/007 362/235 |
| 2010/0027274 | A1* | 2/2010 | Liu | F21V 7/05 362/346 |
| 2010/0165641 | A1* | 7/2010 | Cheng | F21V 7/09 362/346 |
| 2011/0038151 | A1* | 2/2011 | Carraher | F21S 8/08 362/242 |

(Continued)

*Primary Examiner* — Gerald J Sufleta, II
(74) *Attorney, Agent, or Firm* — Michael Petrin; Peter Tormey; Antero, Tormey, Perin

(57) ABSTRACT

The present invention relates generally to low glare illumination arrays and luminaires which act to disperse light into a three-dimensional space providing more uniform and even illumination with reduced glare. The present invention also relates to luminaires and illumination systems employing an array of solid state light sources with shaped bezel light diffusers which act to reduce glare and provide more uniform and even illumination of surfaces and spaces. The present invention also relates to luminaires employing a plurality of linear LED arrays equipped with shaped bezel light diffusers collectively oriented at a common acute angle, optionally including internally curved reflective or non-reflective surfaces to provide improved illumination with reduced glare.

14 Claims, 9 Drawing Sheets

(56) References Cited

U.S. PATENT DOCUMENTS

| | | | |
|---|---|---|---|
| 2011/0194281 A1* | 8/2011 | Josefowicz | F21V 7/0083 |
| | | | 362/235 |
| 2015/0009668 A1* | 1/2015 | Zou | F21V 7/0025 |
| | | | 362/241 |
| 2017/0030552 A1* | 2/2017 | Monteiro | F21V 7/0008 |
| 2020/0408387 A1* | 12/2020 | Broughton | G02B 17/0673 |

* cited by examiner

LOW GLARE LUMINAIRES

PRIORITY

This application claims the benefit of priority of filing of an earlier U.S. patent application Ser. No. 17/320,899, filed on May 14, 2021, which is hereby incorporated herein by reference in its entirety.

BACKGROUND

The present invention relates generally to low glare illumination arrays and luminaires which act to disperse light into a three-dimensional space providing more uniform and even illumination with reduced glare. The present invention also relates to luminaires and illumination systems employing an array of solid state light sources with shaped bezel light diffusers which act to reduce glare and provide more uniform and even illumination of surfaces and spaces. The present invention also relates to luminaires employing a plurality of linear LED arrays equipped with shaped bezel light diffusers collectively oriented at a common acute angle to provide improved illumination with reduced glare.

DESCRIPTION OF RELATED ART

Light emitting diodes (LEDs) have been utilized since about the 1960s. However, for the first few decades of use, the relatively low light output and narrow range of colored illumination limited the LED utilization role to specialized applications (e.g., signal and indicator lamps). As light output improved, LED utilization within other lighting systems, such as within LED "EXIT" signs and LED traffic signals, began to increase. Over the last decade, the white light output capacity of LEDs has more than tripled, thereby allowing the LED to become the lighting solution of choice for a wide range of lighting solutions, replacing fluorescent lamps and lighting systems, particularly due to their low power consumption, longevity and low cost.

LEDs exhibit significantly optimized characteristics for use in lighting fixtures, such as source efficacy, optical control and extremely long operating life, which make them excellent choices for general lighting applications. LED efficiencies, for example, may provide light output magnitudes that may exceed 100 lumens per watt of power dissipation. Energy savings may, therefore, be realized when utilizing LED-based lighting systems as compared to the energy usage of, for example, incandescent, halogen, compact fluorescent and mercury lamp lighting systems. One particular advantage of LEDs is that they may be directly attached or mounted to a printed circuit board (PCB), which may include conductive regions (e.g., conductive pads to dissipate heat) and associated control circuitry. The LED control terminals (e.g., the anode and cathode terminals of the LEDs) may be interconnected via the conductive pads, such that power supply and bias control signals may be applied to transition the LEDs between conductive and nonconductive states, thereby illuminating the LEDs on command and enabling the simultaneous control of an array of LEDs.

The photometric distribution of a forward-biased LED may produce a cone-shaped or omnidirectional pattern of light of varying angle up to about a 180 degree spread of light emanating in all directions from a surface of the PCB upon which the LED is mounted), producing a center illumination zone surrounded by a penumbral illumination zone transitioning to an outer zone absent any illumination.

In order to modify such an omnidirectional photometric distribution, a diffuser element, lens or other typically transparent or translucent plastic diffuser element (e.g., an injection molded acrylic plastic cover with pixelated texture) may be placed over the LED for the purpose of more uniformly dispersing the LED light and eliminating a center "hotspot" or concentration of light emanating from the center of the LED. However, while a diffuser element may be used to modify the photometric distribution pattern from that of an omnidirectional pattern to one of a non-omnidirectional pattern (e.g., a 120 degree spread of light emanating from a surface of the PCB), the intermediate diffuser still absorbs some of the incident light, resulting in some reduction of light intensity through absorption and internal reflection, owing to the typically smooth, shiny and non-textured side of the diffuser being oriented opposite the illumination source. Further, typical diffusers act to better disperse the more intense light originating from the LED at and near the normal incidence angle (i.e. perpendicular to the surface of the LED and generally parallel to the field of illumination (lighted surface) that is desired to be lit uniformly across its surface, so that differences in illumination along the edges, particularly at locations where the incident radiation angles exceed the normal 90 degree axis by more than about 30 to 45 degrees are not diffused as well owing to the more oblique angle of illumination towards the edges compared to the center zone of the diffuser.

Alternatively, one or more optical lens may be mounted forward of the LED to further control the photometric distribution of the LED illumination field. However, this approach requires a special lens design to correct for f-number and spherical aberrations of the lens to transform the LED's typical centered conical illumination pattern into a flat or uniform illumination area or 3D space. While a tailored lens system, such as the innovative batwing-style lens diffuser system of Vode (Vode Lighting, LLC, 21684 8th St. E., Suite 700, Sonoma, Calif. 95476) may alternatively be employed instead of a (flat) diffuser element, the lens adds weight to the luminaire and adds two additional optical surfaces that result in some loss of light due to refraction and reflection processes, as well as presenting two additional surfaces that can collect dust, scratches and otherwise degrade with respect to optimum light transmission over time.

Accordingly, there is a need for some other means of diffusing the illumination pattern of a light source, an LED or array of LEDs, and in particular a better means to provide a more uniform, more diffuse and more evenly dispersed illumination at the edges or periphery of an illuminated zone or penumbral region. Further, some means is also desired that does not require an intermediary diffuser or lens element spaced apart from or located in series conjunction to the source light or LED element or its normal optical axis.

To address this need, one object of the instant invention relates generally to tessellated bezel light diffusers which act to disperse penumbral light providing more uniform and even illumination.

A further object of the instant invention relates to luminaires employing an array of light sources with tessellated bezel light diffusers which act to eliminate edge and transition lighting effects providing more uniform and even illumination between LEDs and at the periphery of illuminated zones.

Another object of the instant invention relates to luminaires employing an array of LEDs with square tessellated bezel light diffusers co-aligned to provide very uniform illumination zones with more evenly dispersed transitional edge lighting than conventional luminaires.

A further object of the instant invention relates to luminaires employing an array of LEDs with shaped bezel light diffusers featuring an internal reflective surface curvature selected to reduce perceived glare over a wider angular observation span and to provide improved illumination, or a "kick" in illumination efficacy.

Another object of the instant invention relates to luminaires employing an array of LEDs with square tessellated bezel light diffusers co-aligned and featuring an internal reflective surface curvature selected to provide very uniform illumination zones with more evenly dispersed transitional edge lighting than conventional luminaires while simultaneously reducing perceived glare over a wider angular observation span.

SUMMARY

To overcome limitations in the prior art, and to overcome other limitations that will become apparent upon reading and understanding the present specification, various inventive embodiments of the instant disclosure describe methods and apparatus for the more uniform projection and dispersion of light from a light source or an LED-based lighting system employed standalone or in a luminaire or an array of luminaires.

One inventive embodiment of the instant disclosure is a luminaire with improved light dispersion properties having (i) at least one or a plurality of light emitting elements; (ii) at least one or a plurality of light shades each positioned adjacent to and surrounding one of the light emitting elements and located about an optical axis perpendicular to the light emitting element; wherein said one or plurality of light shades are arranged in a linear orientation with respect to themselves to form a linear light array; wherein the light shade features a mounting region located at a first distal edge, a plain light shade region continuous with the mounting region, being continuous with a bezel region located adjacent to the plain light shade region and terminating at a second opposed proximate edge; wherein the bezel region features an upper surface in the shape of a polygon; wherein at least one of the bezel regions is rotated about its optical axis so that at least one apex of the bezel region is oriented perpendicularly to a longitudinal axis passing along the length of the luminaire through each of said optical axis; and wherein said one or plurality of rotated bezels provide for a more uniform direct and penumbral light transmission pattern.

Yet another inventive embodiment features a luminaire having a housing element; wherein the housing element supports the light emitting element and the light shade; wherein the mounting region of the light shade is attachable to the housing; and wherein the light emitting element is positioned so that its optical transmission axis is coincident to said optical axis of the light shade.

Another inventive embodiment of the instant disclosure is a luminaire further comprising a mounting system for securing the housing element and providing electrical connectivity means to connect the light emitting element to a power source.

Various inventive embodiments of the instant disclosure contemplate use of a bezel region having an upper surface in the shape of a polygon and wherein said polygon is selected from a triangle, square, heptagon and hexagon, and combinations thereof.

In related inventive embodiments, the luminaire features at least one bezel region of the bezel has an apex oriented perpendicularly to the longitudinal axis of the linear light array, while in a related embodiment the luminaire is configured so that at least one of said apexes of the bezel region of the light shade is rotated at an angle of ninety degrees with respect to the longitudinal axis.

Yet another inventive embodiment includes a luminaire according to the instant disclosure wherein the upper surface of the bezel region is flat.

In a related inventive embodiment, the luminaire features a plurality of light shades, the apexes of the bezels thereof being rotated at an angle greater than zero degrees with respect to the longitudinal axis; wherein each of said plurality of the bezel region of the light shades are all rotated at the same angle.

In a further inventive embodiment, the features a plurality of light shades, the apexes of the bezels thereof being rotated at an angle greater than zero degrees with respect to the longitudinal axis; and wherein at least two of said plurality of the bezel region of the light shades are rotated at two different angles from one another.

In a related embodiment, the inventive disclosure includes luminaires with light shades having a bezel wherein at least one apex of the bezel region extends outward from the center optical axis so as to form an angle that is lesser than a maximum glare threshold angle, $Ø_{max}$, as defined hereinabove by Equation 1.

In yet another embodiment, the inventive disclosure includes luminaires with light shades having a bezel wherein the at least one apex of the bezel region extends outward from the center optical axis with a drop distance E, so as to form a bezel reflective angle range, $\beta$, as defined hereinabove by Equation 2.

In yet another embodiment, the inventive disclosure includes luminaires with light shades having a bezel wherein the at least one apex of the bezel region extends outward from the center optical axis so as to form an angle that is lesser than a maximum glare threshold angle, $Ø_{max}$ and with a drop distance E, so as to define an optimum internal surface curvature R, as defined hereinabove by Equation 3.

In further inventive embodiments, the internal surface of the bezel region of a light shade within a luminaire features a reflective surface that is light-reflective or a non-glare surface that is at least partially light-reflective, or alternatively a surface that is not light-reflective at all.

These and other inventive embodiments of the instant disclosure will be defined and described in more specific detail hereinbelow.

Figure 1A:
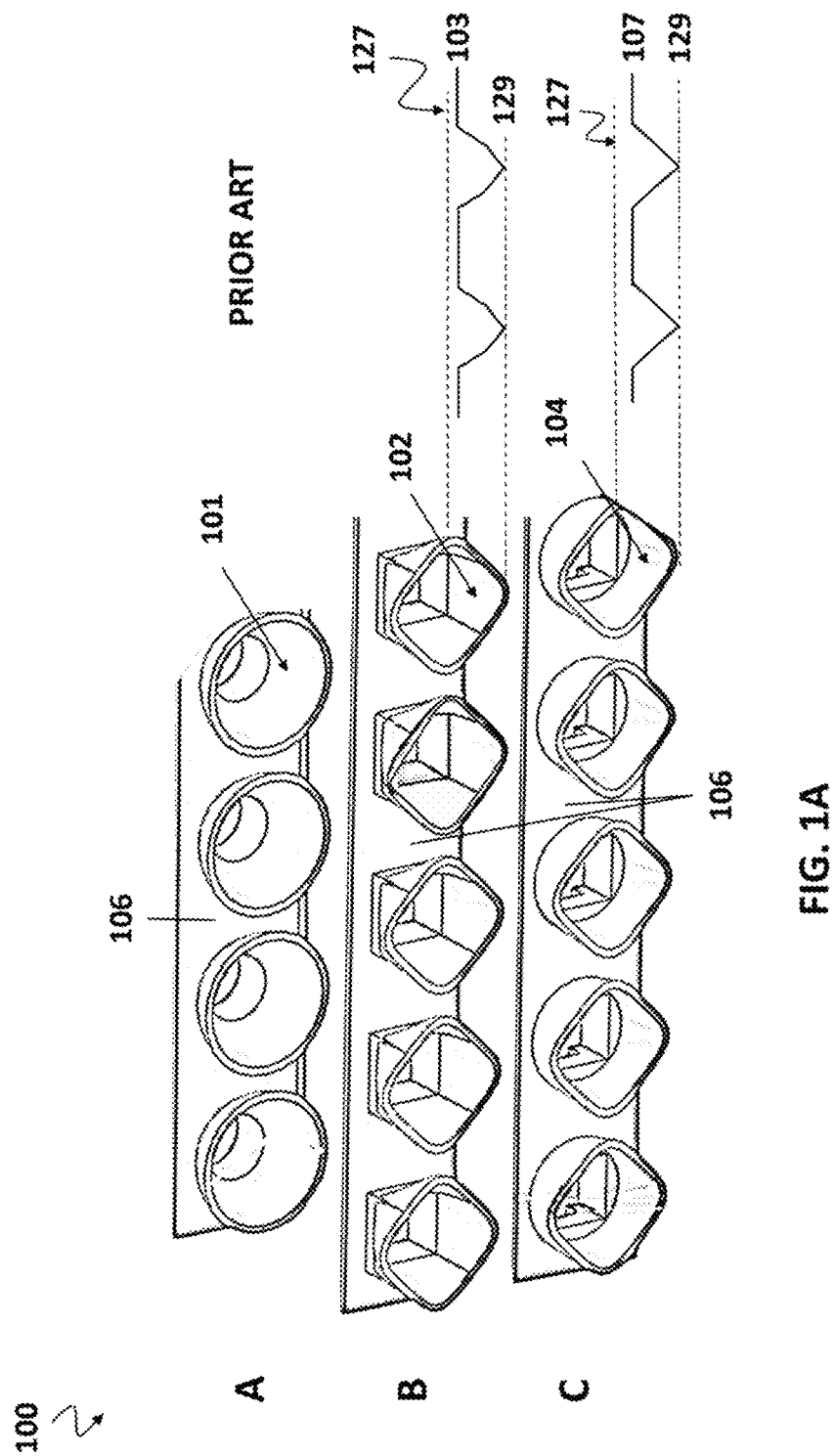
FIGS. 1A and 1B show several embodiments of arrays of LED lighting units with various polygonal shaped bezels providing reduced perceived glare and improved transitional illumination compared to a prior art array.

A corresponding Figure Key detailing the specific components, parts, regions and means of the inventive embodiments as shown in the accompanying figures is attached hereinbelow in the Appendix, which is hereby incorporated by reference.

DESCRIPTION

Generality of Invention

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

Specific examples of components and arrangements are described below to simplify the instant disclosure. These are, of course, merely examples and are not intended to be limiting. In addition, the instant disclosure may repeat reference numerals and/or letters in the various examples. This repetition is for the purpose of simplicity and clarity and does not in itself dictate a relationship between the various embodiments and/or configurations discussed.

Read this application with the following terms and phrases in their most general form. The general meaning of each of these terms or phrases is illustrative, not in any way limiting.

DETAILED DESCRIPTION

FIG. 1A shows illustrations of several linear luminaires 100, being arrays of individual lighting elements each featuring a bezel and an LED light source, arranged in a linear fashion along a mounting plate 106. Compared to the example shown of a typical linear array A, consisting of traditional lighting elements with circular bezels, 101 (Prior Art), are two inventive embodiments according to the instant disclosure of luminaires B and C, having square bezels as indicated by 102 and 104. In the inventive embodiments B & C, the array of square bezels are rotated about their center axis by a relative angle of 45° (degrees) with respect to a linear axis of the array coincident to and parallel with the linear axis of the mounting plate 106 along the horizontal direction indicated. When the inventive array of rotated square bezels are aligned in a colinear pattern, the subsequent effective outline of the combined outer bezels effectively combine to form tessellate patterns according to the instant disclosure as illustrated by trace 103 and 107 in FIG. 1A, corresponding to a first square bezel style 102 and a second square bezel style 104 featuring a smooth interior reflective surface curvature. Thus, in the embodiments shows in FIG. 1, the coaligned individual rotated square bezels combine to form a tessellated pattern with all the advantages and properties as described herein and in copending applications included by reference herein. In contrast, a linear array of lighting elements with square bezels aligned with at least one wall in parallel to the linear axis of the array will effectively combine to form a repeated square tesselate pattern (not shown) in a non-rotated embodiment. Contrasting the two patterns, the rotated square bezel styles 102 and 104 shown in FIG. 1A are slightly preferred over non-rotated square bezels (not shown) due to the wider illumination pattern provided by the former owing to the wider relative width of each bezel in its cross-sectional extent and also due to the smoother tessellation pattern of repeated peaked triangles versus squares, the rotated square bezels combining to form a smoother tessellated illumination pattern in the penumbral zone of lighting provided by the array. The effective tessellation patterns shown in trace B and C of FIG. 1A exhibit effective tessellate heights shown by line 129 with respect to the surface plane of the LED light source illustrated by line 127, which may lie either above or below the plane of the mounting plate 106, depending on the configuration of the LED within the individual lighting elements. Accordingly, in related embodiments, a combination of rotated and non-rotated square bezel lighting units could also be employed in a linear luminaire array to modify the illumination field produced for any particular desired effect by changing the overall effective tessellation pattern of the luminaire as projected onto an illumination plane.

Figure 1B:
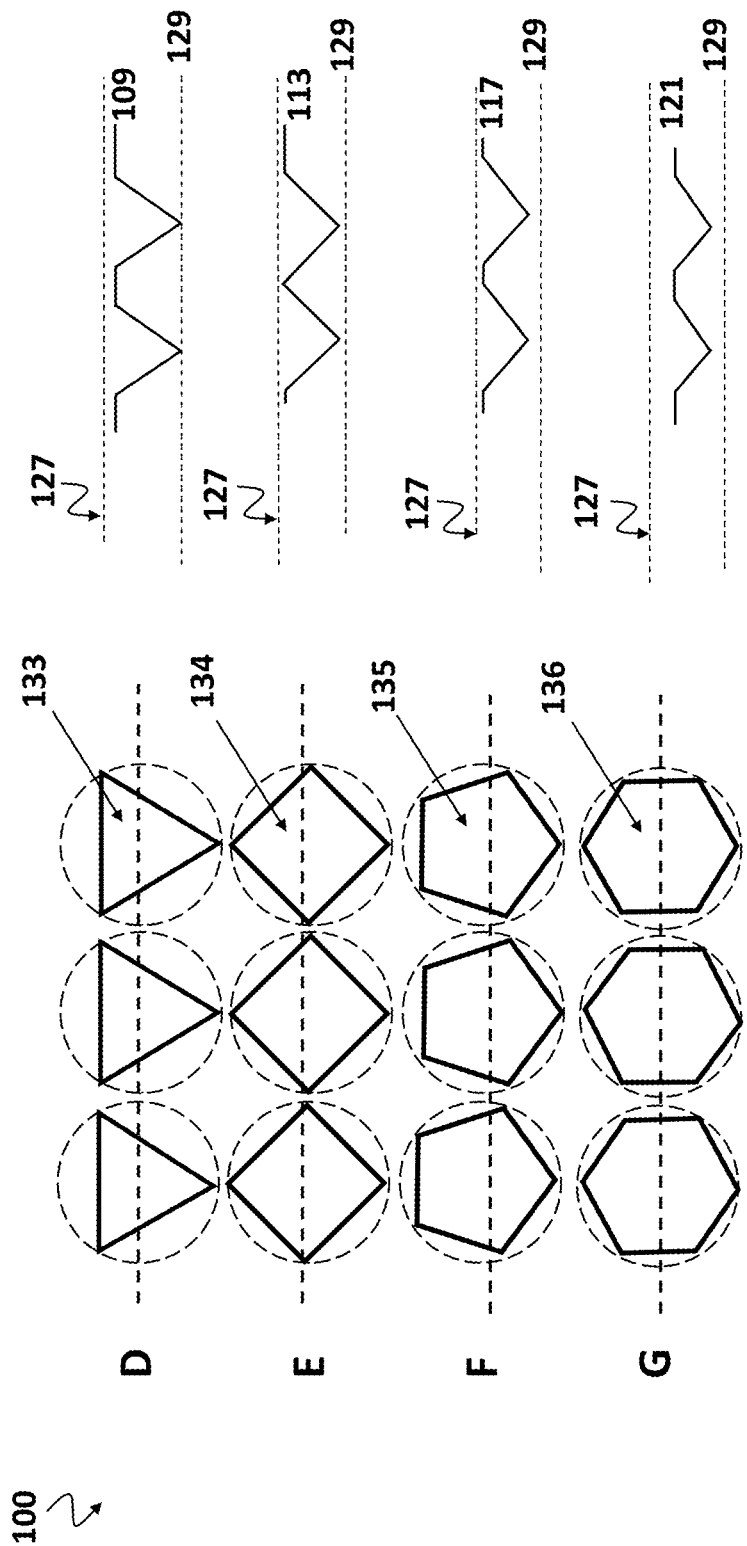

In further inventive embodiments, FIG. 1B shows additional polygonal shaped bezels, 100, having from 3 to 6 sides. FIG. 1B shows an array of triangular shaped bezels, 133, which combine to form a tessellated pattern D corresponding to trace 109. The dotted lines 127 and 129 representing here (as well in following traces within the same figure) of the approximate bezel plane and corresponding maximum bezel height, respectively, not shown in these D-G stylized embodiments.

In the representative embodiments E and G, it is noted that even-sided polygons (wherein the number of sides, n, are even, including n=4, 6) corresponding to square and hexagonal shaped bezels, may be rotated by 90 degrees about a center optical axis without changing the tessellation pattern, and can also be rotated so that an apex of the shape is oriented in a perpendicular direction to the linear axis of the array of individual bezels. Due to this symmetry, inventive luminaires according to the instant disclosure may be used to produce the desired improvement in illumination pattern and reduced glare on either side of the linear array.

In the representative embodiments D and F, it is noted that odd polygons (wherein the number of sides, n, are odd, including n=3, 5) corresponding to triangular and heptagonal shaped bezels, are not capable of being rotated by 90 degrees about a center optical axis without changing the tessellation pattern. In contrast to embodiments with an even number of sides, n, odd polygonal shapes are not symmetric about the same linear axis of the array of individual bezels, so that the tessellation pattern on one side, for example here the upper side, differs from the tessellation pattern on the opposite side (lower side). These embodiments, D and F, provide some advantages when a linear luminaire employing a set of the odd-shaped polygonal bezels is located near a reflective wall or surface where greater illumination is desired, even though the extent of tessellation may be reduced on the 'upper' side, which is then desirably located adjacent to the wall or surface, while the 'lower' side tessellations, being more pronounced, provides for a smoother lighting transition into the illumination space. Conversely, the same linear arrays can be rotated with respect to an adjacent wall or surface to take the greater advantage of the more pronounced tessellation pattern to provide for a smoother lighting transition onto the wall or surface.

Accordingly, by rotation of an otherwise flat or planar-edged bezel having the shape of a polygon, at least one apex of the polygonal shape can be oriented in the direction of the illumination so as to produce a pseudo-tessellation pattern or essentially a projected tessellation pattern according to additional embodiments of the instant disclosure. For example, inventive embodiments B-G show a plurality of individual polygonal bezels arranged in a linear array, oriented so that at least on apex or corner of the shape is coincident to the normal axis (perpendicular to the linear axis of the array) with respect to each individual bezel as well as the array. Accordingly, the arrays B-G produce pseudo-tessellation patterns as shown in the corresponding traces 103, 107, 109, 113, 117 and 121, owing to the pattern of projection of a center light source (not shown) emanating from the respective arrays of bezels onto the illumination field, these patterns then acting in a manner to provide for a more uniform and disperse transitional lighting effect in the penumbral zone of illumination as discussed hereinabove and in the parent application.

In yet further inventive embodiments not illustrated herein, a linear array of polygonal shaped bezels may be combined with alternative bezels rotated to different degrees about their individual lighting axis of rotation, to produce a luminaire having preferred lighting effects adaptable to any particular desired field of illumination. In yet further related inventive embodiments, not illustrated herein, a linear array in a luminaire may also comprise a selection of differently shaped polygonal bezels, in any desired order or pattern, in addition to any desired degree of rotation about their individual axis of rotation, so as to provide a wide variety of illumination patterns. In further inventive embodiments of the instant disclosure some bezels may be fixed in position while other bezels are configured to be movable and adjustable to rotation about their individual axis of rotation so as to allow later manual adjustment and correspondingly alter the illumination pattern in accordance with the selection of bezel shapes, their pattern, and their relative rotation, providing for nearly infinite tuning or selection of the final illumination pattern produced by the inventive luminaires.

In is noted further, by comparing the projected tessellation patterns of the various inventive embodiments shown in FIGS. 1A and 1B, that bezels with a larger number of sides, n, tend to produce 'smoother' edge illumination boundaries as n increases from 3 to 6, owing to the decreased angle of the sides of the bezel, which are 120° for the triangular-shaped bezel 133, 90° for the square-shaped bezel 134, 720 for the heptagonal-shaped bezel 125 and 60° for the hexagonal-shaped bezel 136. Accordingly, by means of the projected or pseudo-tessellation patterns provided by a given shape and rotation, a specific shape and rotation can be selected to achieve a desired lighting pattern. Combinations of different bezels shapes, sizes and relative orientations are also envisioned within the scope of this instant disclosure in order to provide a means to tune the desired illumination pattern of a luminaire array to achieve a desired lighting effect.

Figure 2:
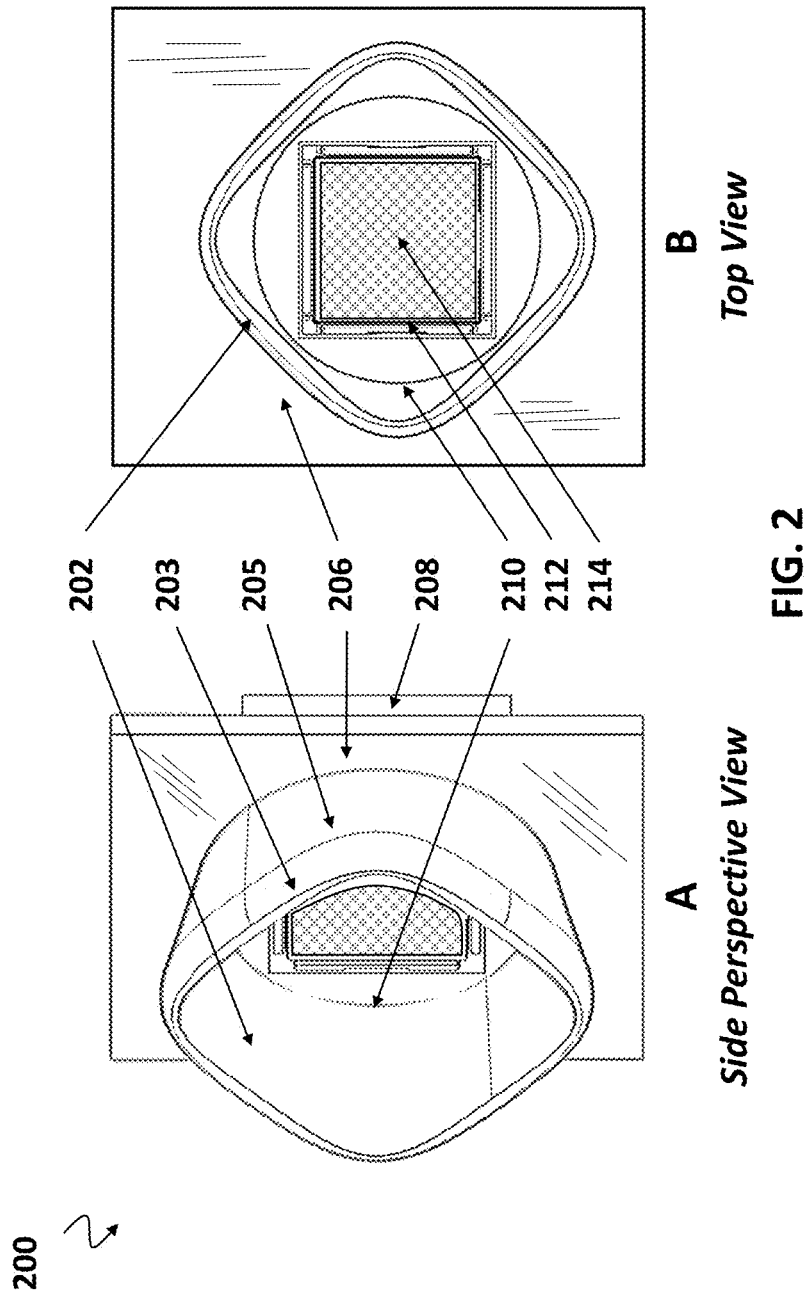
FIG. 2 shows one embodiment of a square tesselate bezel LED lighting unit from front perspective and top views.

FIG. 2 shows one embodiment of a lighting unit with square bezel 200 that is rotated with respect to either of the base mounting plate 206 edges, so that a linear array of such lighting units 200 will combine to form a desirable effective tessellation pattern.

In this embodiment, the lighting unit with square bezel 200 includes a light shade element 202 with a bezel region 203 at the top edge transitioning to a plane shade region 205 that is immediately adjacent to the base mounting plate 206 and attached thereto along the shade mounting region 210 which corresponds to the lower circular portion of the plain shade region, which transitions to a square bezel region 203 as shown in panels A, side perspective view and B providing a top view. The base mounting plate 206 supports the rail mount 208, which provides a means for attaching and aligning one or a plurality of individual light shade elements 200 to a luminaire support plate or surface (not shown). In addition, the base mounting plate 206 supports the base of the light shade element 202 at the shade mounting region 210 on the top or outward surface of 206 and supports the lighting element 212 which features a LED planar array 214, which provides illumination when powered. Alternatively, 214 may be an optical emitting surface (OES), which are typically patterned or frosted, and illuminated from behind (internally) by means of TIR (total internal reflective) optics coupled to an emitting point source LED which is integrated into the lighting element. To form the individual lighting units 200 into a linear array, a plurality of units 200 are aligned side by side and mounted by means of the rail mount 208 to a support rail or surface to support the assembled luminaire. Not shown here, the support rail 208 can also provide a means for powering each individual LED planar array 214 within the combined lighting elements 212. For the embodiment shown in FIG. 2, a linear luminaire may be formed by assembling a plurality of lighting units 200 side by side, or alternatively, by first rotating them either −45° or +45° and then assembling them side by side. In the first instance above, the plurality of lighting elements 212 as shown configured in FIG. 2 can be combined to form a very compact array with a higher linear density of lighting elements than in the second instance above in which the are all rotated prior to assembly in a linear pattern, which will produce a luminaire with lower linear density of lighting elements owing to the base mounting plate 206 being rectangular rather than square in shape in these particular embodiments. This added advantage enables the illumination density of the linear array of the inventive luminaires disclosed herein to be selected and adjusted according to need or preference during its assembly. One advantage of TIR optics is that their optical emitting surfaces can be textured, patterned, ridged or frosted in order to improve uniformity of lighting, or tinted for color correction effects.

While the use of planar TIR (total internal reflective) optics or planar LED lighting elements are preferred versus a point LED source, both may be employed in embodiments of the instant invention. Generally, TIRs and planer LEDs offer a higher density of illumination and improved uniformity of radiation across their surface area, but not being a point-source, tends to be more prone to perceived glare owing to the larger surface area being perceived by an observer over a wider angular degree, which contributes to perceived glare, both direct and indirect, as discussed below. Alternatively, TIR optics (total internal reflection) modules can be employed in further inventive embodiments in place of the planer LED or point LED sources discussed here, resulting in a point or planar light-emitting surface similar to that illustrated in FIG. 2 as elements 212 and 214.

Figure 3:
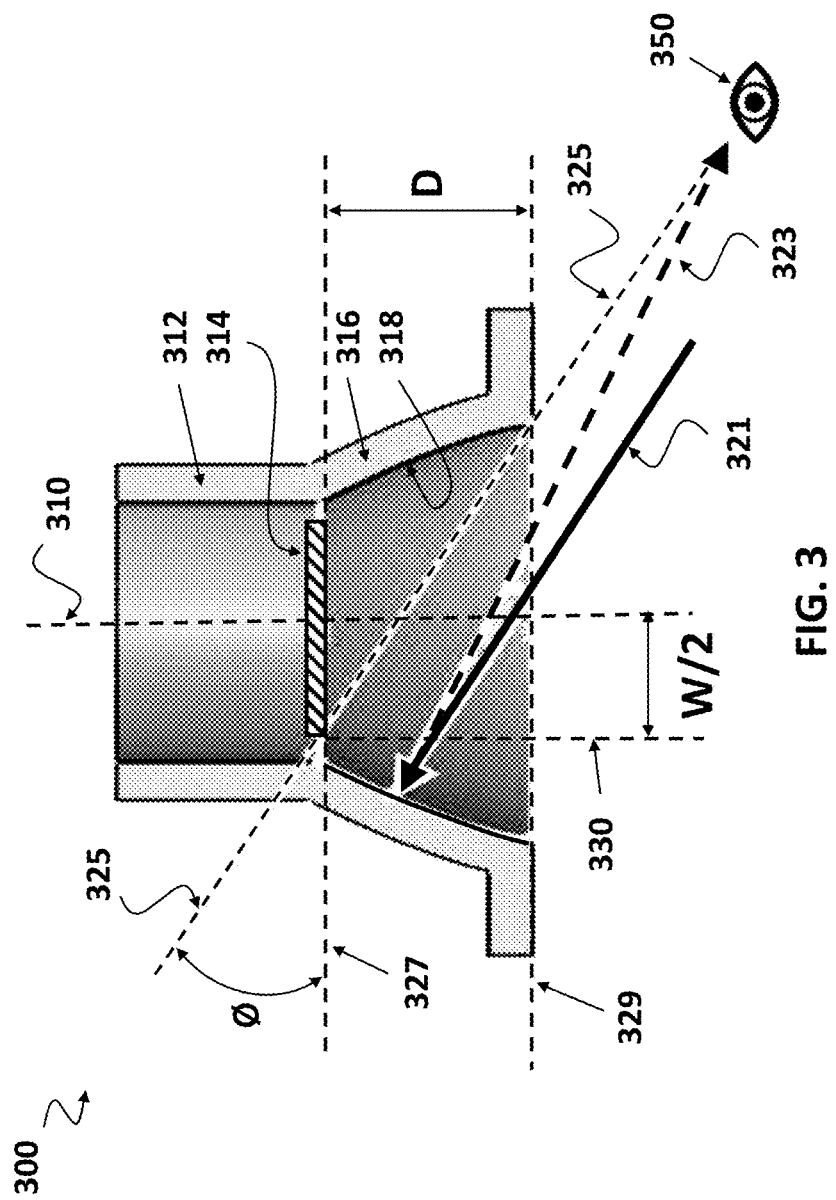
FIG. 3 shows an embodiment of a shaped bezel LED lighting unit from a side cutaway perspective featuring an optimized internally reflective curvature with reduced perceived glare characteristics.

FIG. 3 shows a cross-sectional cutaway view of a lighting unit 300 that provides reduced glare to an observer, the reduced glare being attributable, without being bound by theory, to the combination of light shade portion 316 and an internally reflective surface curvature 318 of the bezel's interior that reduces the perceived angular extent of glare to an observer eye 350 and provides a 'kick' in illumination efficacy by redirecting incident light from the LED element 314 (or alternatively a TIR optic element 314 featuring an internal LED and terminating in a flat patterned lens) to the illumination field. In this embodiment represented in FIG. 3, the lighting unit 300 features a center optical axis 310 that passes through the center of 300 and simultaneous the center of the planar LED lighting element 314 (or TIR optic element) having a planar LED edge denoted by dashed line 330 and of the lighting unit body portion 312 of the light shade portion 316 of the bezel element. The lighting unit body portion 312 supports a planar LED lighting element 314 whose surface defines and is parallel to the horizontal optical plane 327, being located a distance, D, from the lighting unit horizontal plane 329 which is parallel to the outer distal surface of the light shade portion 316 of the bezel. The LED element 314 can have varying widths, W, which changes the extent of the glare threshold line 325 with respect to the angle theta, Ø, which is the angular degree of declination of the glare threshold line 325 compared to the horizontal optical plane 327. The glare threshold line 325 represents a limiting line (and plane) above which no direct glare from any portion of the planar LED lighting element 314 can be perceived by an observer's eye, represented by 350. Below the threshold line 325, internal reflections from the inner reflective coating 318 and any returned or incident light 321 entering the bezel and reflected back to the same observation point 350 can be controlled and minimized by adjusting the curvature of the inner reflective coating 318 or inner surface of the light shade portion 316 upon which a reflective coating has been applied. The combination of the outer bezel shape and the curvature of the inner reflective coating or surface 318 can be selected to adjust both direct glare (by changing—19—the glare threshold line 325) and to reduce perceived indirect glare resulting from internally reflective lighting 323. Alternatively, TIR optics (total internal reflection) modules can be employed in further inventive embodiments in place of the planar or point LED sources discussed here, resulting in a point or planar light-emitting surface similar to that illustrated in FIG. 3 as element 314, occupying the space above 314 and located within the lighting unit body portion 312 of the light shade portion 316 of the bezel (cowling) element. In yet alternative inventive embodiments, it is advantageous for the internal surface of the bezel or light shade element be only partially or fully-non-reflective in nature, to prevent any internal primary (single) and secondary (compound) reflections from emanating from the interior bezel surface to further eliminate or reduce perceived glare.

Figure 4:
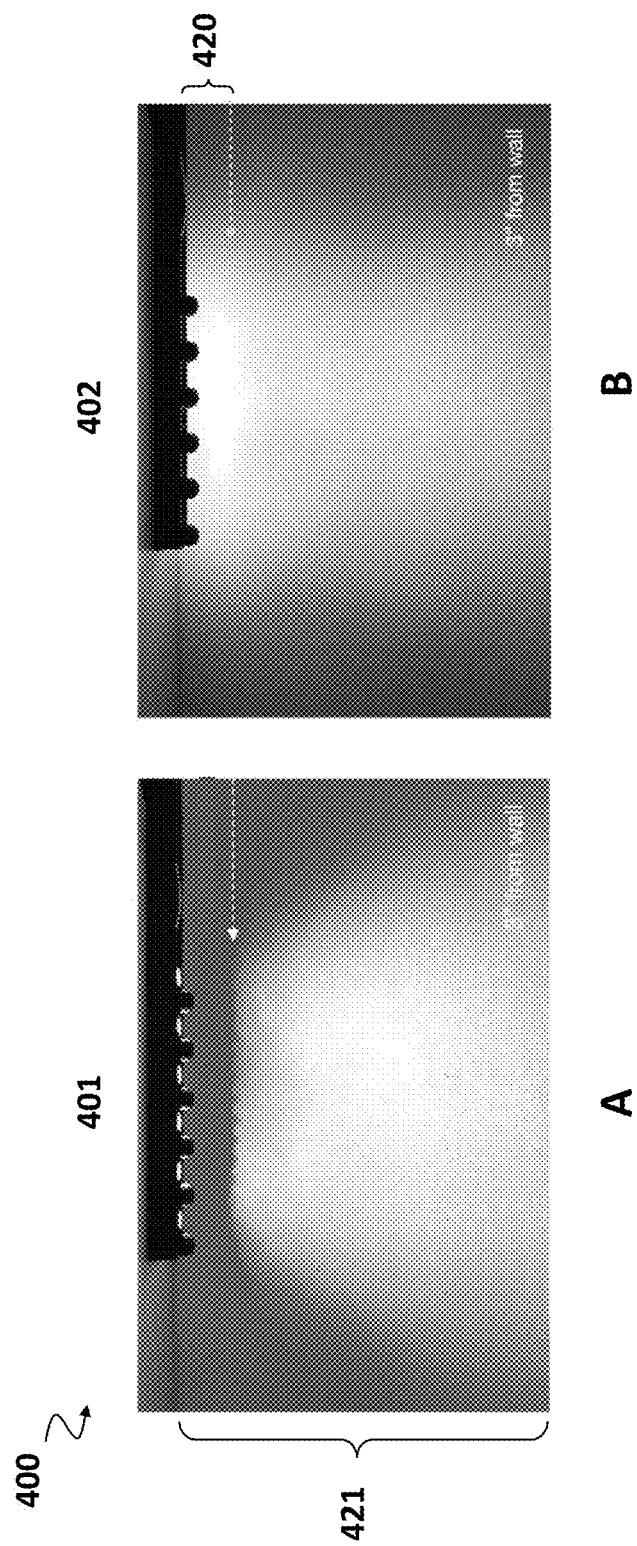
FIG. 4 shows illumination plots of arrays of LED lighting units with non-tessellated bezels (A) compared to co-aligned square tesselate bezels (B) displaced from a wall surface.

In should also be noted that in one inventive embodiment, a rotated square bezel configuration is advantageous when the LED array is configured in a square shape, the relative rotation of the two in a preferred 45° offset angle being advantageous to reduce perceived glare. Typically, square LED arrays or TIR optics in a square configuration may be employed where the size of emitting surface of the array or optic component is between 1×1 mm and 25×25 mm. The advantages of both a rotated square bezel configuration and optimized internally reflective surface curvature in an array of LED lighting units forming a linear luminaire can be seen by comparing illumination plots 400 as shown in FIG. 4, where a non-tessellated bezel configuration 401 is compared to a tessellated bezel configuration 402, in panels A and B, respectively. Both luminaires 401 and 402 are placed on a wall surface perpendicular to the illumination plane 421 shown, separately from the wall a distance of about 3 inches, represented by spacing 420.

FIG. 4 shows that a comparative luminaire with alternating rotated and non-rotated bezel configurations (a total of twelve adjacent lighting units located in linear fashion with respect to one another) produces an illumination pattern as shown in panel A which exhibits a notable visual transition between the directly illuminated area (below line 420 and extending in that direction toward the distal extent of 421) and the penumbral region around 420 that extends from there into the non-illuminated region between 421 and the wall. It is first noted that the lighting units with rotated square bezels as seen in panel A, corresponding then to lighting units 1, 3, 5, 7, 9 and 11, have reduced glare compared to the non-rotated units 2, 4, 6, 8, 10 and 12, the rotation of the bezel resulting in an increased glare threshold 323 and a larger angle theta, Ø defining the limit of the angular degree of declination of the glare threshold line 323, as noted because no direct or indirect internal reflection is visible emanating from the set of rotated bezels (which appear dark) compared to the set of non-rotated bezels, which appear lighter in panel A. It is also to be noted, that glare from the non-rotated bezels tends to illuminate the outside surfaces of the adjacent bezels located on either side, also contributing to some smaller extent to the perceived glare, and also making the outer surface of bezel visible due to scattered light, even when the bezel material selected here is a black polymer material finished with a matt surface appearance. In contrast, an array of fully rotated square bezel lighting units, 402, exhibits significantly reduced direct glare as well as eliminating scattered glare from the external surfaces of immediately adjacent bezels, which appear dark and non-illuminated in luminaire 402 as compared to 401.

In contrast, the inventive embodiment 402 representing an array of fully rotated square bezel lighting units (a total of twelve adjacent to each other, all rotated as disclosed herein by 45°) produces a much improved illumination pattern as seen in panel B. By means of the rotated square bezels, the sharp transition otherwise seen in the penumbral region 420 in comparative example 401, is significantly smoother, resulting in a much uniformity in lighting across this region. Further, the presence of optimized internally reflective surfaces (colloquially dubbed as "kickers") in each of the lighting units results in a greater field of illumination without any glare, which notably is not seen emanating from any of the individual lighting unis with rotated bezels shown as 402. Further, due to the optimized internally reflective surfaces being present in 402, this array produces an extended illumination field about the penumbral illumination transition zone (corresponding to the line 420) which results in improved and more uniform illumination into that region between the wall and 420. The results seen here are enhanced owing to the close location of the luminaire arrays 401 and 402 with respect to the wall, being placed about 3 inches from the illuminated surface.

Figure 5:
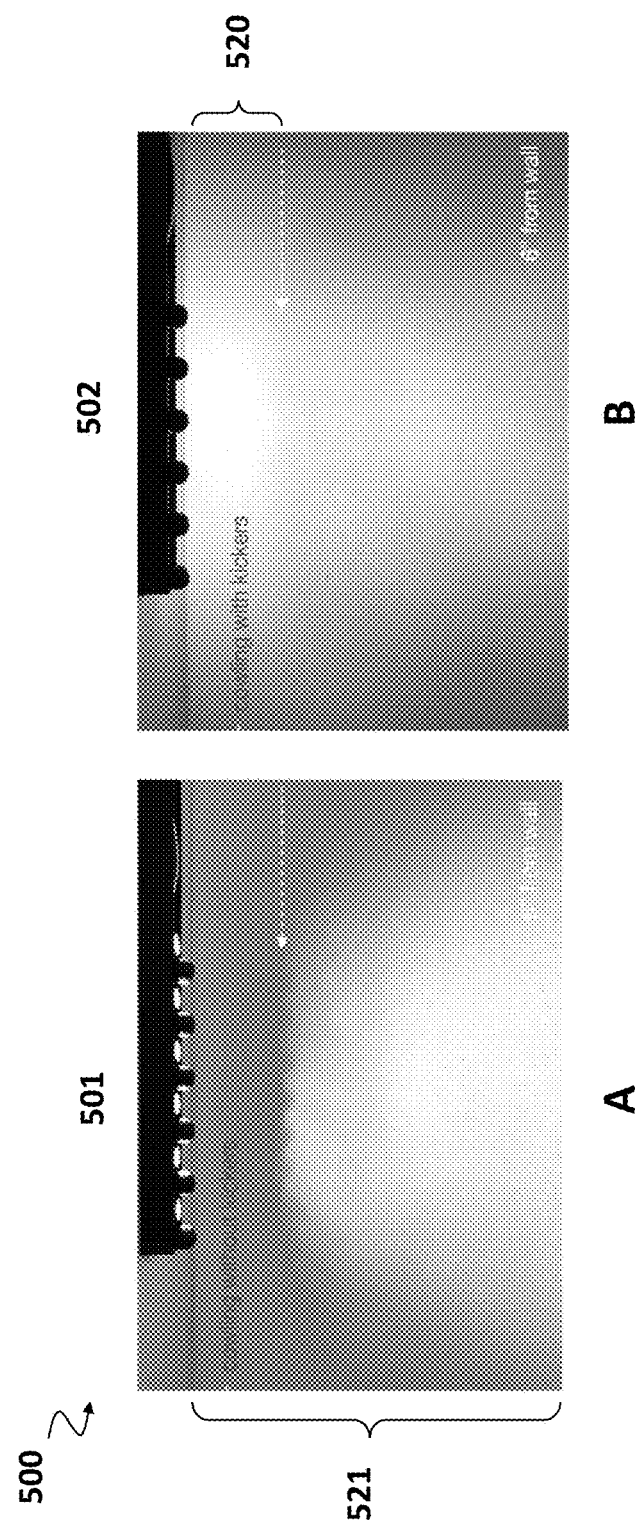
FIG. 5 shows illumination plots of arrays of LED lighting units with non-tessellated bezels (A) compared to co-aligned square tesselate bezels (B) with optimized internally reflective curvatures displaced further from a wall surface.
Figure 6:
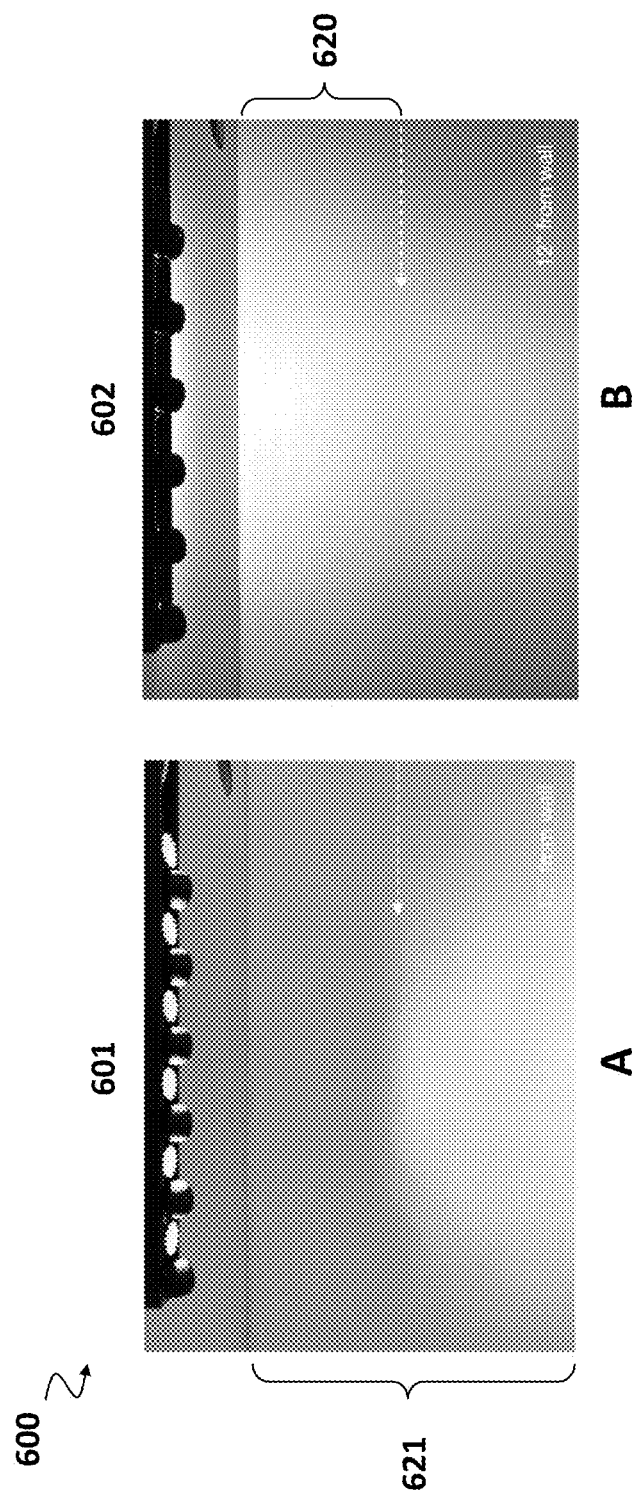
FIG. 6 shows illumination plots of arrays of LED lighting units with non-tessellated bezels (A) compared to co-aligned square tesselate bezels (B) displaced somewhat further from a wall surface.

Additional comparisons of the above comparative and inventive embodiments of a luminaire arrays are shown for greater distances of separation from a wall, including placement approximately 6 inches (FIG. 5) and 12 inches (FIG. 6).

In FIG. 5, the illumination pattern of a comparative luminaire array 501 (corresponding to 401) is compared to an inventive embodiment of the instant disclosure, 502, being a luminaire array consisting of all fully rotated square bezels with additional presence of optimized internally reflective surfaces in all lighting elements of the array (corresponding to 402). First, it is noted that 501 produces significant direct glare to the observer, as direct illumination can be perceived from the non-rotated lighting units, Secondly, it is noted that 501 products scattered glare as a result of cross-illumination of the adjacent bezels to either side of a non-rotated lighting unit, as light can be seen reflected from the exterior surfaces of the bezels, despite being constructed of a black polymer material finished with a matt surface appearance. Thirdly, it is noted that the penumbral transition zone indicated by the line 520 is visually apparent to the eye, the transition between the non-illuminated zone extending from the wall to line 520 representing a significant fraction of the illumination place 621, as seen in panel A. In contrast, the inventive embodiment of fully rotated square bezels arranged in a linear luminaire 602 also featuring bezels with optimized internally reflecting surfaces, produces a much more uniform field of illumination both in the penumbral zone about line 520 and in the region between the wall and line 520, and also in the illuminated zone between line 520 and the extent of the illumination zone defined as 521, as seen in panel B. Accordingly, inventive embodiments of the instant disclosure featuring an array of co-aligned and rotated square bezels results in a linear luminaire array that produces a more uniform illumination pattern with improved penumbral zone lighting, and simultaneously acts to reduce the amount of directly perceived glare and indirect or scattered glare otherwise emitted by a bezel surface adjacent to a light source. Further, the shape and presence of a reflective internal film on an optimized internal surface curvature of the individual bezels results in increased illumination about the penumbral zone and into the otherwise non-illuminated region between the penumbral zone and the wall denoted as 520, without any direct or indirect perceived glare to the observer.

In FIG. 6, the illumination pattern of a comparative luminaire array 601 (corresponding to 401 and 501) is compared to an inventive embodiment of the instant disclosure, 602, being a luminaire array consisting of all fully rotated square bezels with additional presence of optimized internally reflective surfaces in all lighting elements of the array (corresponding to 402 and 502). First, it is noted that 601 produces significant direct glare to the observer, as direct illumination can be perceived from the non-rotated lighting units, Secondly, it is noted that 601 products scattered glare as a result of cross-illumination of the adjacent bezels to either side of a non-rotated lighting unit, as light can be seen reflected from the exterior surfaces of the bezels, despite being constructed of a black polymer material finished with a matt surface appearance. Thirdly, it is noted that the penumbral transition zone indicated by the line 620 is visually apparent to the eye, the transition between the non-illuminated zone extending from the wall to line 620 representing a significant fraction of the illumination place 621, as seen in panel A. In contrast, the inventive embodiment of fully rotated square bezels arranged in a linear luminaire 602 also featuring bezels with optimized internally reflecting surfaces, produces a much more uniform field of illumination both in the penumbral zone about line 620 and in the region between the wall and line 620, and also in the illuminated zone between line 620 and the extent of the illumination zone defined as 621, as seen in panel B. Accordingly, inventive embodiments of the instant disclosure featuring an array of co-aligned and rotated square bezels results in a linear luminaire array that produces a more uniform illumination pattern with improved penumbral zone lighting, and simultaneously acts to reduce the amount of directly perceived glare and indirect or scattered glare otherwise emitted by a bezel surface adjacent to a light source. Further, the shape and presence of a reflective internal film on an optimized internal surface curvature of the individual bezels results in increased illumination about the penumbral zone and into the otherwise non-illuminated region between the penumbral zone and the wall denoted as 620, without any direct or indirect perceived glare to the observer. It is also to be noted that the inventive embodiments shown do not project illumination onto or produce glare on the surface to which they are attached (ceiling) as the distance from the ceiling to the wall (the illumination) zone increases over the range of 3 to 12 inches. Accordingly, one additional advantage is the ability to locate the inventive embodiments of the disclosed luminaire arrays close to a wall or ceiling transition, or similar corner or wall junction, without producing and projecting unwanted glare into the illumination zone or onto an adjacent surface that is not intended to be illuminated.

Optimized Internal Curvature

Figure 7:
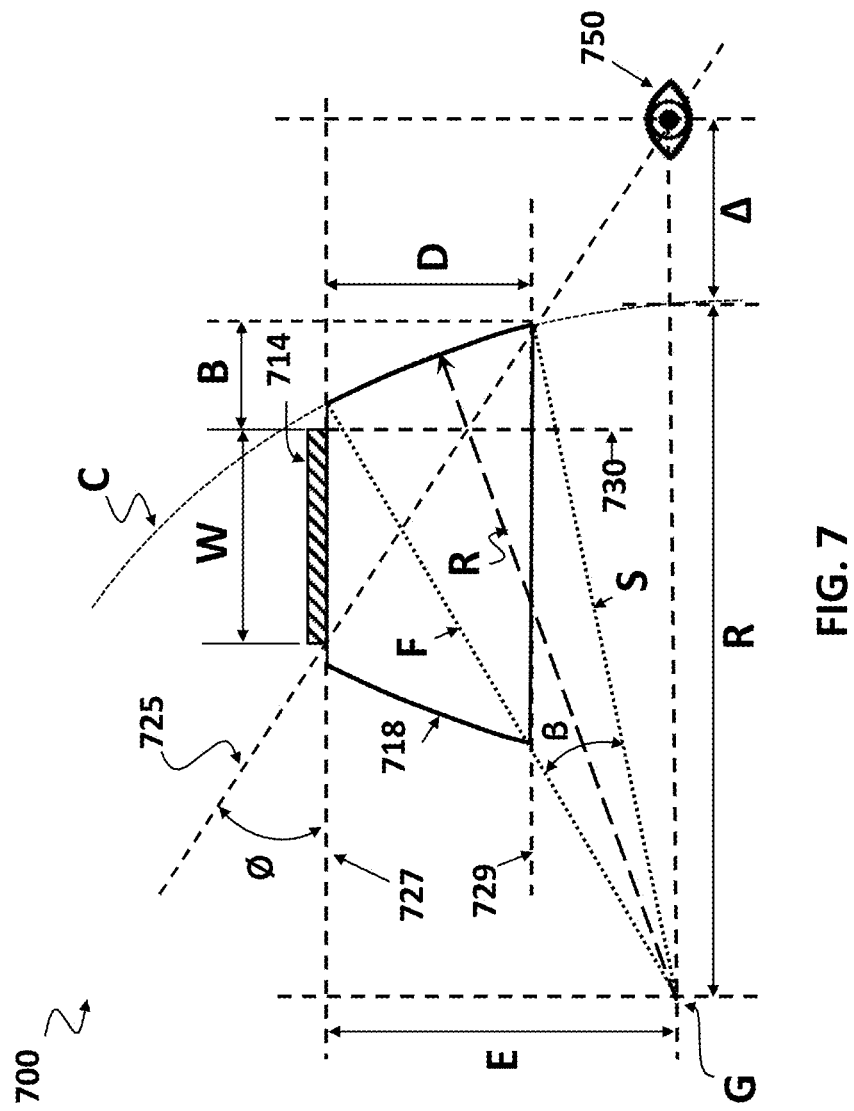
FIG. 7 shows a side-view stylized embodiment of an optimized internally reflective curvature bezel and LED light source featuring reduced perceived glare characteristics.

FIG. 7 shows a schematic cross-section, al view of one embodiment of a low glare bezel 700 which features an optical emitting surface 714 as the source of light, located at the bezel mount horizontal axis, denoted by line 727 and centered about an optical axis passing through the lighting unit and center of 714 (not shown here, see FIG. 3). It should be noted that the relative proportionality of the illustration, while accurate with respect to the trigonometric relations disclosed and discussed below, are not necessarily reflected in the drawing scale as shown in FIG. 7, the observer typically being located well below a typical ceiling mounted luminaire as disclosed herein, and the illustrated angles being accordingly either foreshortened or exaggerated for the purpose of illustration.

As discussed hereinabove, glare is seen when an observer's eye 750 is exposed to direct light emanating from any portion of the LED source, defining a glare threshold line 725, below which glare is observed and above which glare is blocked by the distal protruding edge of the bezel of the lighting unit along the viewing angle, shown as Ø, and having an approximate angular extent of between 10° to about 60°, or alternatively between 20° and 50°, or alternatively between 30° and 45°. The angle increases with increases in the depth, D, of the bezel with respect to the width, W, of the optical emitting surface 714 and its observable edge indicated by line 730, and the cross-sectional extent of the outer periphery of the bezel. Accordingly, increasing the relative depth D of the bezel with respect to W, and decreasing the outer periphery of the bezel results in an increased viewing angle, Ø, and a decrease in the slope of the glare threshold line 725 and an overall decrease in perceived glare with respect to an observer.

Indirect glare is also less desirable, being light that is redirected or reflected into the observer's field of field rather than transmitted directly. Looking at the embodiment shown in FIG. 7 to a second observer located at position G, indirect glare is perceivable over the angular extent, β, which is defined as the angle between sightline F which views the uppermost visible extent of the internally reflecting surface 718 and sightline S which views the lowermost extent of the lighting unit terminating at the distal edge of the bezel. Within this angular extent, β, the observer G can perceive otherwise redirected or indirect glare reflected from the internally reflecting surface 718 of the light shade and bezel portion of the lighting unit. As the relative position of the observer moves along the R direction, the displacement, delta Δ, with the edge of the bezel at the sightline 725 matches R, the radius of curvature (C, denoted by the finally dashed partial curve shown) of the internally reflecting surface, so that no indirect glare reaches the observer below the sightline S or above the sightline F. Similarly, when the observer G position changes with respect to E, the glare free drop distance, then the amount of perceived glare changes, increasing the distance E tends to increase the angular extent of glare, β, visible to the observer, while decreasing E results in a decreased angular extent of glare. Accordingly, an optimized internally reflective surface can be configured by using the parameters W and D, the internal radius of curvature R, to optimized a viewing angle, β, to be minimized with respect to an observer capable of viewing the bezelled lighting unit from a vertical drop distance E and a horizontal separation, delta Δ, below the direct glare threshold line and a separation, R, below the indirect glare threshold line S. In one inventive embodiment of the instant disclosure, an optimized set of parameters is selected to minimize the viewing angle β. In other related embodiments, an optimized set of parameters is selected to increase the Ø glare cutoff angle. In another related embodiment, the square shaped bezel edge of a lighting unit is rotated so the maximum cross-sectional diameter with respect to a viewer's position 750 and a second observer's position G benefits from a perceived reduction in direct glare resulting from light being emitted directly into their eye, owing to an decrease in the delta Δ dimension and an increase in the R dimension, respectively. In yet another related embodiment, the internal surface curvature of the shaped bezel of the lighting unit can be configured as an approximately parabolic or spherical reflective surface having at least one major radius of curvature, R, and optionally a second minor radius of curvature R' (not shown), that produces an optimized surface curvature C, at least partially over an arcuate radial extent of angle β, wherein the value R is selected to minimize β at a desired viewing position occupied by viewer G at displacement positions corresponding to the glare free drop distance, E and a distance delta (Δ) from the edge of the optimized bezel according to the instant disclosure. It is also to be noted that if a totally non-reflective interior surface or coating on the respective bezel or cowling portion of the inventive luminaire assembly is employed, that any glare from a reflection event will be eliminated, and the corresponding limits for the perceived glare angle and angular extent thereof will be significantly different compared to an inventive embodiment herein featuring internally reflective surface contributing to primary and secondary reflection events.

The glare angle theta, Ø, clearly depends on the width W of the LED unit, taking on a maximum glare threshold angle, $Ø_{max}$, when W is very small, corresponding to a center LED light source that is a pin-source, rather than a flat LED array of tangible dimension and width W, and correspondingly approaching a minimum value when W is larger, W ultimately being constrained by the internal cross-sectional dimension of the base region of the light shade according to the instant disclosure. In general, the hypotenuse corresponding to the glare threshold line 725 shares a side adjacent with two equilateral triangles represented by the geometric relationship below:

$$\tan Ø = \frac{D}{(W+B)} > \frac{E}{(W+B+\Delta)} < \tan Ø_{max} \qquad \text{Eq. 1}$$

wherein the radius value R, corresponding to the internal curvature of the bezel 718 and the corresponding reflective surface thereof, follows a relationship, with respect to the sight position G; wherein R is equal to S and F in magnitude; and wherein S and F are the minimum and maximum sight hypotenuse lines (glare threshold lines), respectively where an observer is exposed to redirected light from inside the bezel region of the lighting unit. As a result of the sight position G mirroring the observers' eye position 750, the complementary relationship defines three additional equilateral triangles with a shared side adjacent, thus enabling the glare angle limits to be expressed as below:

$$\sin Ø = \frac{E}{(R+\Delta)}; \qquad \text{Eq. 2}$$

$$\sin \beta = \frac{(E-D)}{R} < \sin\left(Ø + \frac{1}{2}\beta\right) = \frac{E}{R} < \sin Ø_{max}$$

so that the optimum radius of curvature, R, with a bezel according to the present inventive disclosure having an optimized set of selected parameters, B, D and W, may be expressed in terms of a lower and upper limit as:

$$\frac{(E-D)}{\sin \beta} \geq R \leq \frac{E}{\sin\left(Ø + \frac{1}{2}\beta\right)} \qquad \text{Eq. 3}$$

Further, for any desired glare angle Ø and angle β, the various dimensional parameters of the light shade and bezel portion of the lighting unit of the inventive luminaire can be defined as follows, for B and D for a given LED width, W:

$$B = E - (W-A) \times \tan Ø \qquad \text{Eq. 4}$$

and;

$$(W+B) \times \tan Ø \geq D \leq (E - R \sin 13) \qquad \text{Eq. 5}$$

Alternatively, the above relationships may be used to determine the glare angle Ø and the bezel reflective angle range β from a given set of bezel dimensional parameters. While more sophisticated ray-tracing calculations may be applied as well, these simple trigonometric relationships help to define the basic geometrical constraints of the various embodiments of the present invention, enabling determination of preferred and optimized dimensional parameters for the bezel designs of the lighting units of the inventive luminaires disclosed herein. Again, it should be noted that the relative size and proportionality of the illustration in FIG. 7 is not necessarily to scale, further discussion of which follows hereinbelow.

In general, an observer whose eye is represented as 750 in FIG. 7 will perceive light (and glare) only along a sight line parallel to the ground, and extending approximately +300 (thirty degrees) above and approximately −30° below this sightline, representing a conical forward view of sixty degrees. As represented by the side-view illustration of one embodiment of the inventive luminaire as shown in FIG. 7, this corresponds to the angle Ø, although the proportion of the illustration is not necessarily to scale as represented. This angle of perception is based in part by taking the maximum height of a typical observer to be 5' 7" (or 67 inches), the statistical 90 percentile human male eye level, and accounting for downward variations in height assuming that the inventive luminaires are ceiling mounted at a typical height of 108" AFF, or average above the finish floor height (in inches), or alternatively the illumination plane. The above relationships and angular limits assume that the observer does not "look up" when traversing the illumination field, so that any perceived glare is within the peripheral vision zone of the observer. Nevertheless, even when an observer is elevating their visual reference line, the angle Ø represents the cut-off angle to perceive either direct light emanating from the LED source and indirect reflected light (both primary and secondary visual reflections) emanating from an internal reflective surface of the bezel of the inventive luminaires disclosed herein.

Figure 8:
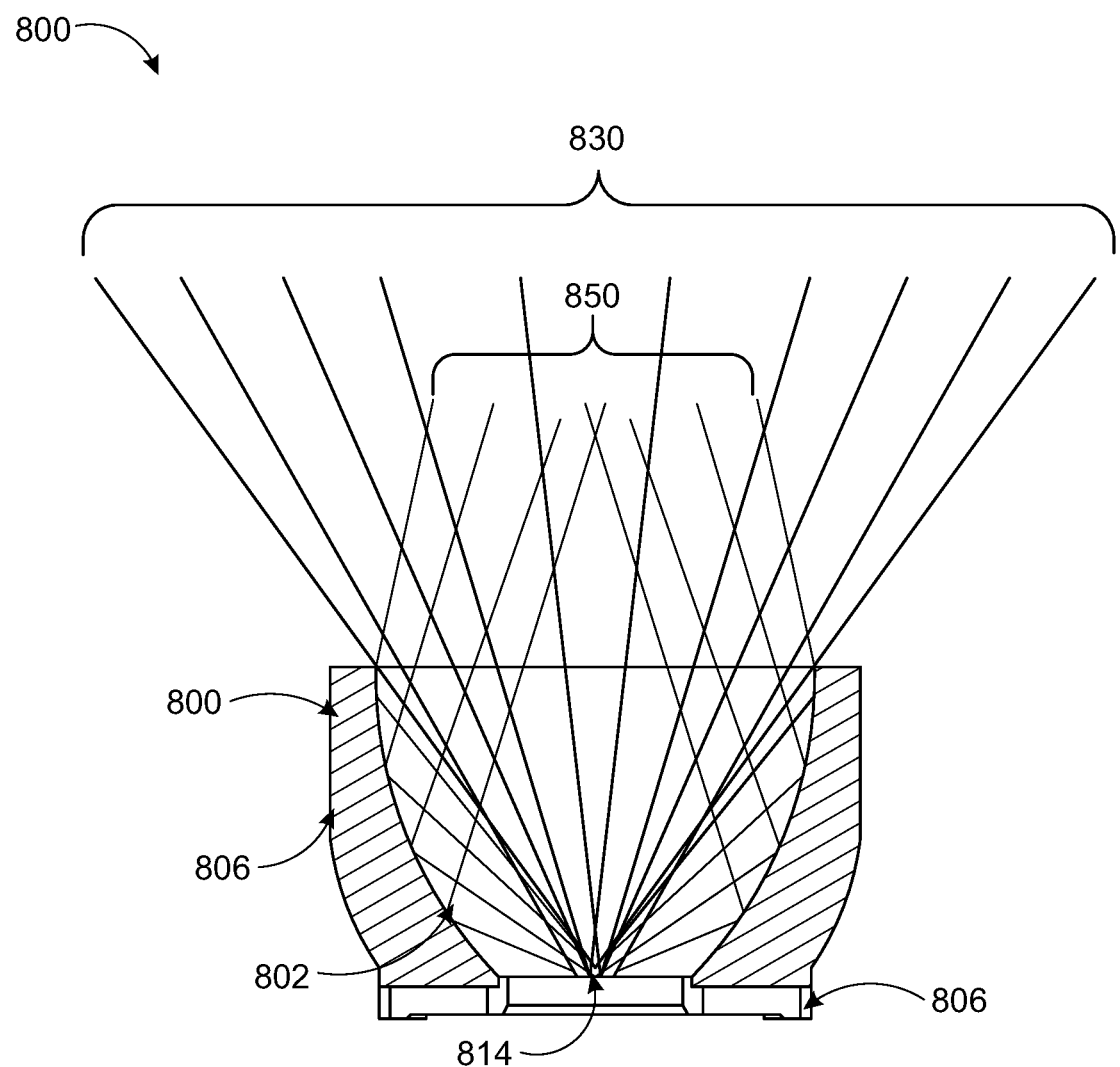
FIG. 8 shows an illustrative side-view of an LED lighting unit showing direct rays and indirect (reflective) rays emanating from an LED array and from an internal reflective surface of the bezel.

FIG. 8 shows an illustration of one inventive embodiment of a low glare bezel 800, featuring a centrally located LED lighting element 814 located on a base mounting plate 806 that supports the lighting element and light shade element 802, which features a bezel region 803 and an internally reflective coating 813 located on the inner surface of the light shade element 802. It can be seen that a plurality of direct rays, 830, emanating from the LED lighting element 814 are emitted without interference from the low glare bezel 800, the width, depth and shape of the internal edge or profile of the bezel region 803 determining the angular extent of the emitted cone (in three dimensions) or light. In addition, a plurality of indirect rays, 850, represented by the shorter, lighter traces shown in FIG. 8, are those emanating from the internal reflective surface coating 813. Ideally, in one embodiment of the instant invention, the primary radius R (see FIG. 7) of the curvature of the internal bezel surface is selected so that the resulting indirect rays 850 are substantially parallel to one another over the extent of the angular emission of these primary reflective rays. Further, the primary radius R may be selected so that little or no secondary reflective rays resulting from two internal reflective events are produced. In alternative embodiments, the shape of the curvature of the internal bezel surface (318 and 718, for example) may be spherical in shape and defined by a single R value, or alternatively be represented by an ellipsoidal, oblate, parabolic, trumpet shape, or curved (partially circular or spherical) or aspherical shape defined by a primary R value and a secondary R' (secondary radius) value.

Accordingly, the illustrated embodiments of the instant disclosure provide for improved bezel systems for lighting units that feature improved illumination to a space or an observer, by collectively improving the smoothness and uniformity of illumination across the penumbral illumination zone and acting to decrease both direct and indirectly perceived glare by an observer, so that there is an overall improved illumination effect with reduced eye strain to one or a plurality of observers positioned about an inventive lighting unit.

Tessellation Patterns

According to inventive embodiments of the instant disclosure, embodiments of polygon-shaped bezels and their projected tessellation patterns provide for improved illumination patterns and more evenly lighted transition regions between directly illuminated zones and partially illuminated penumbral zones. Further, embodiments wherein a plurality of square-shaped bezels in a linear array are commonly aligned by their axis of rotation with respect to the linear axis of the array are tested and shown to provide for improved uniformity of illumination and more evenly lighted transition regions between directly illuminated zones and partially illuminated penumbral zones. Further, other polygon-shaped or polygonal bezels including those in the shapes of triangles, squares, pentagons and hexagons are additional inventive embodiments of the instant disclosure that can be employed in individual lighting units as well as combined in arrays in a luminaire, wherein their relative rotational orientations with respect to the longitudinal axis of the luminaire array may be selected to optimize the overall illumination pattern produced by the luminaire as desired.

Light Sources

Another inventive embodiment of the instant disclosure is a luminaire wherein the light source is a solid state light source selected from an LED, LED array, Lambertian emitter, 2Π emitter, and fiber optic light guide.

Yet another inventive embodiment of the instant disclosure is a luminaire wherein the light source is a linear light source selected from an incandescent lamp, fluorescent tube, linear LED, linear LED array, linear Lambertian emitter, and linear fiber optic light guide or the like.

A further inventive embodiment of the instant disclosure employs luminaires wherein the LED light source is a TIR (totally internally reflective) optical unit featuring one or a plurality of internal LED emitting units housed within a totally internally reflective housing terminated with an emitting surface from which substantially parallel light rays are emitted. These are commercially available from multiple sources, including for example but not limited to Ledil Oy, Finland or their Unites States associates, Ledil Inc., with a business address of 228 West Page Street Suite D, Sycamore Ill. 60178 USA; Carclo Optics, 600 Depot Street, Latrobe, Pa. 15650 USA, and Fusion Optix, supplier of linear LED arrays and linear TIR optics, located at 17 Wheeling Avenue. Woburn Mass. 01801 USA.

Materials of Construction

Any suitable material that is acceptable for use as a light bezel or bezel for a light source or luminaire can be employed, including, but not limited to plastics, polymers, metals, alloys, wood, composites, cellulosic materials, and combinations thereof. Generally, embodiments presented herein employ opaque materials that are not inherently light transmitting, so that the tessellated patterns of the respective bezels produce the desired improvements to illumination as disclosed herein. In related embodiments, combinations of transparent, translucent or at least partially light transmitting materials may also be employed in combination with more opaque or less light transmitting materials to form optically tessellated bezels that employ regions of light transmitting and non-transmitting materials in patterns selected from those tessellation patterns disclosed herein, to produce an optical effect similar to that described herewith fully opaque bezels whose tessellation patterns are made by addition or subtraction of material from a bezel edge. Accordingly, by way of a nonlimiting example, an optical tessellated bezel formed by coextrusion of two materials, a first light transmitting material and a second opaque material otherwise being physically co-extrudable, in a manner to form one or more of the tessellation patterns disclosed herein, wherein the opaque material corresponds to a tessellated feature or pattern and the light transmitting material is present and corresponds to what would otherwise be the open spaces or open tessellate portions in the tessellation bezel. In these related inventive embodiments, light passes through the transparent, translucent or light transmitting regions in a similar manner as in embodiments where light passes through an open space in the tessellated region, although the light is attenuated to some extent by passing through the first material.

In related embodiments, the tessellation patterns, rather than being subtractions or additions of material to a bezel edge, may be formed by combining light-transmitting and non-light transmitting (opaque) portions that are physically distinct from one another, located immediately adjacent to one another in a manner that produces an optical tessellation pattern similar to any inventive tessellation pattern described herein.

Further, to improve the illumination efficacy of the embodiments of the instant disclosure, the internal reflective surface of the bezels may be coated or composed of a highly reflective material capable of redirecting incident light. Suitable metallic coatings to produce mirror-like surfaces on metal and plastic components are well known in the art and can be employed here. In other embodiments, non-metal films and coatings also well known in the art can be used on the internal surface of the bezel. For example, a highly polished reflective black surface or surface coating may be employed, or in contrast a highly reflective mirror or chromed surface may be used. In related inventive embodiments, the internal surface of the bezel portion of the light shade may bear or be coated with an anti-reflective or anti-glare coating which is at least partially reflective. Such anti-glare coatings are not necessarily anti-reflective, but modulate any reflected light by means of optical interference effects so as to reduce direct glare while still being reflective and adding to the overall illumination efficacy of the luminaire array. One non-limiting example is a 180° antireflective coating that is a layered composite of thin deposited layers, usually a metal or metal oxide, that reduces reflections from a surface owing to light interference effects. These are commonly identified by the rainbow or iridescent effect noted when observing them under white or neutral lighting conditions, and are generally selected by choosing layer thicknesses corresponding to a ½λ (half-wave lambda) wavelength of the light source emission maximum, so as to produce the most optimum interference between successive light reflections emanating from the coated surface or plurality of layers of a coated surface or internal surface of a bezel. Common anti-glare coatings include dielectric coatings, interference coatings and grating-like finishes that provide the desired optical properties of reduced glare with minimum reduction in reflected light intensity. Alternatively, unique surface texturing of the internal bezel surface may be employed, such as for example, using embossed or patterned surfaces repeating a select surface feature such as a miniature reflective element in the shape of a scale (resembling those of a fish or butterfly), dimple, retroreflector cubit, or other surface feature that is suitably made by impression molding or patterning after an injection molding process to produce the desired pattern. \

In further inventive embodiments, it may be desirable to employ a non-reflective interior surface or surface coating. In one inventive embodiment, the interior surface may be coated with a non-reflective substance, such as Vantablack, a product of Surrey NanoSystems Ltd, a United Kingdom business or their United States associates, Santa Barbara Infrared, Inc., 30 S. Calle Cesar Chavez, Suite D, Santa Barbara, Calif. 93103 USA. The Vantablack S-VIS and Vantablack VBX2, materials for example are sprayable materials based on nanocarbon structured composites that form a plurality of nanoscale pillars on a coated surface which nearly totally absorb and prevent transmission of light impinging on that surface. According to Surrey NanoSystems, the technology is based on a functionalized 'forest' of millions upon millions of incredibly small tubes made of carbon, or carbon nanotubes (CNTs) grown in a CVD (carbon vapor deposition) reactor at 400° C. Each nanotube in the Vantablack forest has a diameter of around 10 nanometers and they are typically 30 microns long.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A luminaire with improved light dispersion properties comprising:
   a) a plurality of light emitting elements;
   b) a plurality of light shades each positioned adjacent to and surrounding one of said light emitting elements and located about an optical axis perpendicular to said light emitting element;
   wherein said plurality of light shades are arranged in a linear orientation with respect to themselves to form a linear light array;
   wherein each one of said light shade features: a mounting region located at a first distal edge, a plain light shade region continuous with said mounting region, the plain light shade region being continuous with a bezel region that terminates at a second opposed proximate edge;
   wherein said bezel region features an upper surface in the shape of a polygon;
   wherein at least one of said bezel regions is rotated about its optical axis so that at least one apex of said at least one bezel region is oriented perpendicularly to a longitudinal axis passing along the length of said luminaire through each of said optical axis; and
   wherein said one or plurality of rotated bezels provide for a more uniform direct and penumbral light transmission pattern as compared to the non-rotated bezel(s).

2. The luminaire of claim 1, further comprising a housing element; wherein said housing element supports said light emitting element and said light shade; wherein said mounting region of said light shade is attachable to said housing;

and wherein said light emitting element is positioned so that its optical transmission axis is coincident to said optical axis of said light shade.

3. The luminaire of claim 2, further comprising a mounting system for securing said housing element and providing electrical connectivity means to connect said light emitting element to a power source.

4. The luminaire of claim 1, wherein said bezel region has an upper surface in the shape of a polygon and wherein said polygon is selected from a triangle, square, heptagon and hexagon, and combinations thereof.

5. The luminaire of claim 4, wherein at least one bezel region of said bezel has an apex oriented perpendicularly to said longitudinal axis of said linear light array.

6. The luminaire of claim 5, wherein said upper surface of said bezel region is flat.

7. The luminaire of claim 4, wherein at least one of said apexes of said bezel region of said light shade is rotated at an angle of ninety degrees with respect to said longitudinal axis.

8. The luminaire of claim 7, wherein all of said apexes are rotated at an angle greater than zero degrees with respect to said longitudinal axis; wherein each of said plurality of said bezel region of said light shades are all rotated at the same angle.

9. The luminaire of claim 7, wherein all of said apexes are rotated at an angle greater than zero degrees with respect to said longitudinal axis; and wherein at least two of said plurality of said bezel region of said light shades are rotated at two different angles from one another.

10. The luminaire of claim 1, wherein said at least one apex of said bezel region extends outward from said center optical axis so as to form an angle that is lesser than a maximum glare threshold angle, $\varnothing_{max}$, as defined herein by the following Equation 1:

$$\tan\varnothing = \frac{D}{(W+B)} > \frac{E}{(W+B+\Delta)} < \tan\varnothing_{max}$$

wherein $\varnothing$ (theta) is a glare angle; D is the depth of said bezel region; W is the width of a planar light emitting diode (LED) element; B is a width of said bezel region; E is a glare free drop distance; $\Delta$ (delta) is a displacement distance; wherein equivalent terms are expressed as being equal (=); and wherein the relative values of each one of said terms are further expressed as being either greater than (>) or less than (<) another of said terms.

11. The luminaire of claim 1, wherein said at least one apex of said bezel region extends outward from said center optical axis with a drop distance E, so as to form a bezel reflective angle range, $\beta$, as defined herein by the following Equation 2:

$$\sin\varnothing = \frac{E}{(R+\Delta)};$$

$$\sin\beta = \frac{(E-D)}{R} < \sin\left(\varnothing + \frac{1}{2}\beta\right) = \frac{E}{R} < \sin\varnothing_{max}$$

wherein $\varnothing$ (theta) is a glare angle; E is a glare free drop distance; $\Delta$ (delta) is a displacement distance; R is a major internal radius of curvature of said bezel region; D is the depth of said bezel region; $\varnothing$ (theta) is a glare angle; $\varnothing_{max}$ is a maximum glare threshold angle; wherein equivalent terms are expressed as being equal (=); and wherein the relative values of each one of said terms are further expressed as being either greater than (>) or less than (<) another of said terms.

12. The luminaire of claim 1, wherein said at least one apex of said bezel region extends outward from said center optical axis so as to form an angle that is lesser than a maximum glare threshold angle, $\varnothing_{max}$ and with a glare free drop distance E, so as to define an optimum internal surface curvature R, as defined herein by the following Equation 3:

$$\frac{(E-D)}{\sin\beta} \ge R \le \frac{E}{\sin\left(\varnothing + \frac{1}{2}\beta\right)}$$

wherein D is the depth of said bezel region; $\beta$ (beta) is a bezel reflective angle range; $\varnothing$ (theta) is a glare angle; and wherein the relative values of each one of said terms are further expressed as being either greater than or equal to ($\ge$) or less than or equal to ($\le$) another of said terms, and wherein parameters B and D of said light shade are defined herein by the following Equation 4:

$$B = E - [(W - \Delta) \times \tan \varnothing]$$

wherein B is a width of said bezel region; W is the width of a planar light emitting diode (LED) element; $\Delta$ (delta) is a displacement distance, and by the following Equation 5:

$$[(W+B) \times \tan \varnothing] \ge D \le (E - R \sin \beta)$$

respectively; wherein equivalent terms are expressed as being equal (=); and wherein the relative values of each one of said terms are further expressed as being either greater than or equal to ($\ge$) or less than or equal to ($\le$) another of said terms.

13. The luminaire of claim 1, wherein an internal surface of said bezel region of said light shade features a light-reflective surface.

14. The luminaire of claim 13, wherein said internal surface of said bezel region features a non-glare surface that is not light-reflective.

\* \* \* \* \*